United States Patent [19]

Braun et al.

[11] Patent Number: 5,269,280
[45] Date of Patent: Dec. 14, 1993

[54] FUEL INJECTOR FOR GASEOUS FUEL

[75] Inventors: Thomas A. Braun, Eden Prairie; Anton Braun, Minneapolis, both of Minn.

[73] Assignee: Tectonics Companies, Inc., Bloomington, Minn.

[21] Appl. No.: 817,883

[22] Filed: Jan. 7, 1992

[51] Int. Cl.⁵ .................................. F02B 43/00
[52] U.S. Cl. .................. 123/527; 123/46 R; 251/30.01
[58] Field of Search ............... 123/90.14, 501, 527, 123/46 R, 46 SC, 276 E; 251/30.01

[56] References Cited

U.S. PATENT DOCUMENTS

| | | | |
|---|---|---|---|
| 2,408,883 | 10/1946 | Rode | 251/30.01 |
| 3,188,047 | 6/1965 | Criffield | 251/30.01 |
| 3,722,481 | 3/1973 | Braun | 123/46 R |
| 3,769,950 | 11/1973 | Braun | 123/46 R |
| 3,853,100 | 12/1974 | Braun | 123/46 SC |
| 4,568,251 | 2/1986 | Braun | 123/465 C |
| 4,722,312 | 2/1988 | Yamada | 251/30.01 |
| 4,846,126 | 7/1989 | Stannard | 123/276 E |
| 4,865,001 | 9/1989 | Jensen | 123/276 E |
| 4,867,189 | 9/1989 | Moineau | 251/30.01 |
| 4,957,075 | 9/1990 | Hasegawa | 251/30.01 |
| 4,969,600 | 11/1990 | Nicol | 251/30.01 |
| 5,136,986 | 8/1992 | Jensen | 123/527 |
| 5,150,685 | 9/1992 | Porter | 123/527 |

OTHER PUBLICATIONS

Orshansky Division Catalog sheet for Servojet fuel injector.

*Primary Examiner*—Carl S. Miller
*Attorney, Agent, or Firm*—Merchant, Gould, Smith, Edell, Welter & Schmidt

[57] ABSTRACT

A fuel injector for injecting gaseous fuel into an internal combustion engine. The injector includes an electromagnetic control valve which controls the admission of actuation gas to a metering valve assembly. The metering valve incorporates a positive mechanical stop to limit valve lift. The force to open the metering valve is supplied by the actuation gas.

6 Claims, 3 Drawing Sheets

FUEL INJECTOR FOR GASEOUS FUEL

BACKGROUND OF THE INVENTION

1. Field of the Invention

The present invention relates to fuel injectors for use with internal combustion engines. The injector is used for the timed injection of gaseous fuel and may be used with conventional crank based engines. However, the injector finds particular utility when used for direct injection of gaseous fuel into a two-stroke free-piston engine.

2. Description of the Prior Art

Both mechanical and electromagnetic fuel injection systems are widely used to introduce fuel into internal combustion engines.

Mechanical injection systems of the Diesel-type supply pressurized liquid fuel directly into the combustion chamber of the engine. In these systems both the force required to inject the fuel, and the injection timing is derived directly from the mechanical motion of the engine.

The electromagnetic solenoid-type injector is typically used for indirect injection of liquid fuel into the manifold of a spark ignition engine. Less frequently this type of injector is used to inject fuel directly into the cylinder of a spark ignition engine. With injection systems of this type a high pressure vane-type fuel pump may be used to supply pressurized liquid fuel to an electromagnetic solenoid actuated fluid valve. Frequently, the mass flow rate of air into the engine is monitored by a computerized control system and an appropriate fuel injector duration is computed. A current pulse of an appropriate duration and magnitude is supplied to the injector solenoid to open it, typically the metering valve closes under spring pressure. In operation, a magnetic solenoid assembly lifts a fuel metering valve off a seat permitting pressurized fuel to be introduced into the engine manifold. The mass of the solenoid assembly limits the rate at which the valve can open and accurate metering requires an open duration in the tens of milliseconds range. In the case of a gaseous fuel injector, the volume of fuel required to inject is hundreds of times greater and therefore would result in an even larger and heavier valve. Consequently, the moving elements of such injectors cannot be synchronized with high engine speed for most direct injection applications.

Although indirect or manifold injection systems must accurately meter the fuel, there is a relatively long time interval to inject the fuel and therefore the mass of the injector valve structures is not as critical to fuel delivery performance. Since there is no requirement that injector operation be synchronized directly to engine motion, such injection systems typically emulate carburation systems. Prior art solenoid injectors of the type described are particularly unsuited for the synchronized injection of gaseous fuel into a variable stroke free-piston engine.

SUMMARY OF THE INVENTION

The present gas injector may be used to meter gaseous fuel into a free-piston or other type of internal combustion engine. The gaseous fuel is supplied at a relatively low pressure to a mechanical metering valve. The metering valve employs a positive mechanical stop and is preferably operated by a source of relatively high pressure actuation gas which is in turn controlled by a control valve. The control valve is preferably of the electromagnetic solenoid type. This hybrid system provides good metering of the low pressure gaseous fuel. The relatively short injection periods permitted by the hybrid system allows the fuel injector to operate in synchrony with the engine. Synchronous operation is particularly advantageous for the operation of piston port two-stroke free-piston engines to prevent short circuiting of fuel out the exhaust.

BRIEF DESCRIPTION OF THE DRAWINGS

Throughout the several views of the drawing, identical reference numerals indicate identical structure, wherein.

DETAILED DESCRIPTION OF THE PREFERRED EMBODIMENTS

Figure 3:
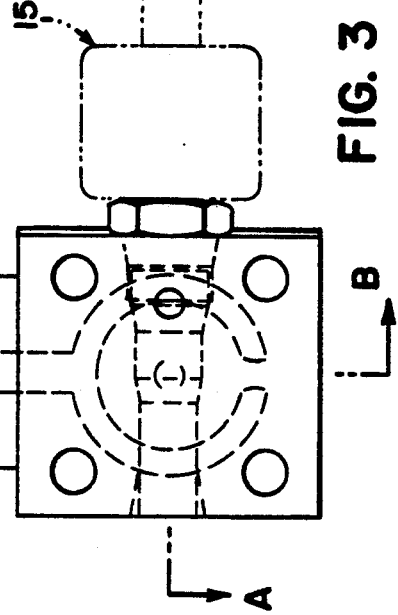
FIG. 3 is a bottom sectional view indicating the location of sectional lines A—A and B—B.
Figure 1:
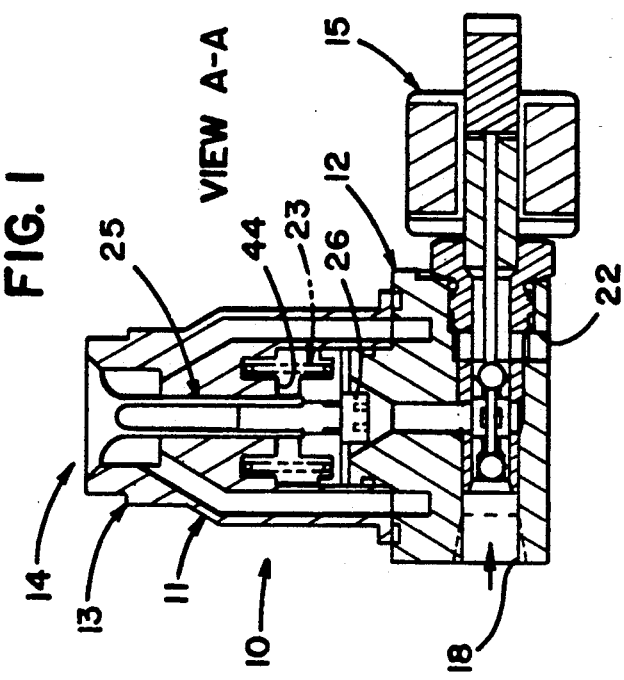
FIG. 1 is a sectional elevation view of the injector taken along line A—A.
Figure 6:
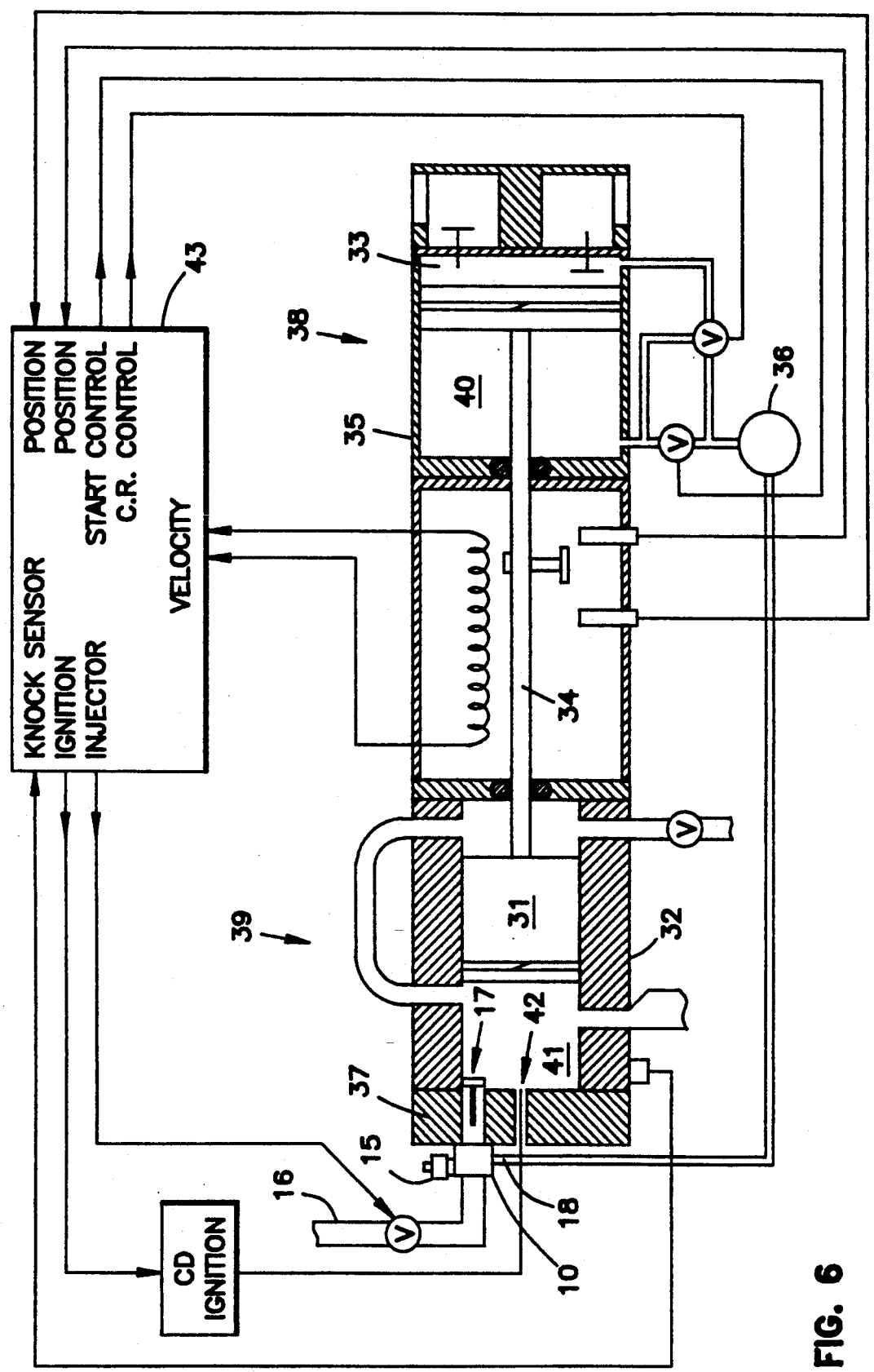
FIG. 6 is a schematic diagram of free-piston engine using the gas injector.

FIG. 1 depicts the injector 10 in crossection. The body of the injector is preferably formed in two parts. The first portion is a metering valve receiver 11, the second portion is a control valve receiver 12. The metering valve receiver 11 has a mounting annulus 13 which permits the attachment of the injector to the engine as shown in FIG. 6. The metering valve receiver 11 has a cavity for receiving a metering valve assembly 14. The control valve receiver 12 is adapted to receive a control valve assembly generally designated 15 and seen best in FIG. 1 and FIG. 3.

Gaseous fuel enters the injector 10 through an appropriate fuel gas inlet 16, and is discharged through a discharge port 17. High pressure actuation gas enters the control valve assembly 15 through an appropriate actuation gas inlet 18, where it meets the control valve mechanisms. A typical control valve will have a solenoid operated ball-type three way poppet valve. In general this valve can reciprocate to control the admission of actuation gas to the metering valve cylinder 24 or vent the actuation gas from the metering valve cylinder 24 to a lower pressure.

Figure 2:
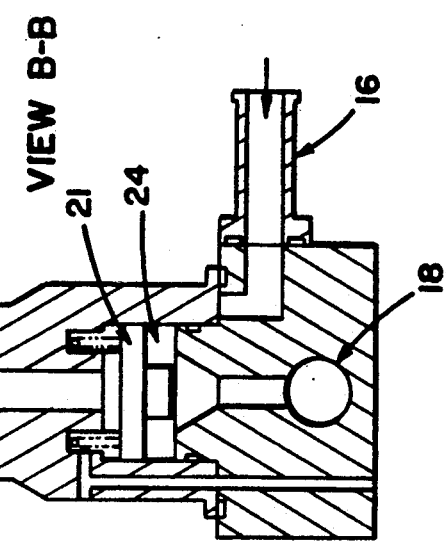
FIG. 2 is a sectional elevation view taken along line B—B.

In operation, the control valve assembly 15 is operated electrically and controls the admission of actuation gas to the metering valve assembly 14. The force supplied by this actuation gas lifts the metering valve 19 off the metering valve seat 20, as best seen in FIG. 2. The required actuation force is generated by the application of gas pressure against the area of a metering valve piston 21. The valve piston 21 bottoms out against a positive mechanical stop surface 44 (FIG. 1) which limits valve lift. The preferred mechanical stop structure is the interior surface of the metering valve cylinder, which abuts the metering valve piston 21 at maximum lift as seen in FIG. 2.

At the conclusion of injection, the control valve assembly 15 vents the actuation gas to substantially atmospheric pressure through blowdown orifice 22 best seen in FIG. 1. When the actuation gas is blown down to atmospheric pressure, the valve spring 23 supplies force to reseat the metering valve 19 onto the metering valve seat 20.

In this fashion the control valve assembly 15 regulates the flow of actuation gas and the force of this gas pressure opens the metering valve 19. This schema permits a relatively large volume of low pressure gaseous fuel to be accurately metered and rapidly introduced into the engine. These injector characteristics make the system particularly useful in two-stroke free-piston engines where it is desirable to time fuel injection on a stroke-by-stroke basis to limit or minimize short-circuiting of the fuel during scavenging of the exhaust.

Figure 4:
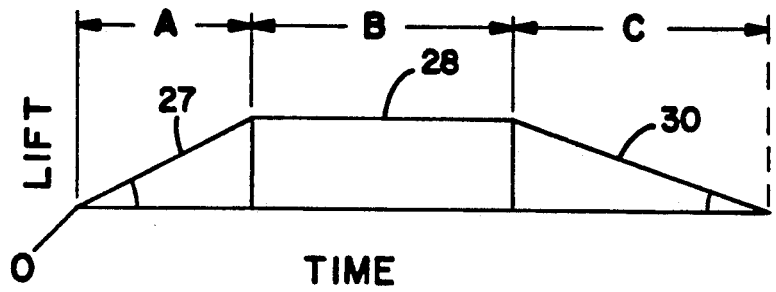
FIG. 4 is a time history of metering valve motion during one cycle of operation; and, FIG. 5 is a time history of the control signal supplied to the control valve during one cycle of operation.
Figure 5:
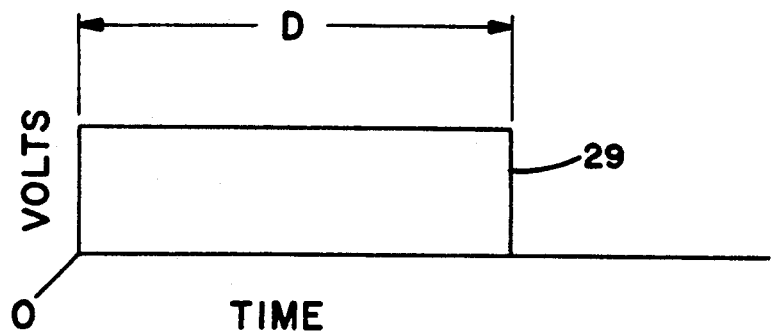

The dynamics of the injector may be understood in connection with FIG. 4. which shows valve lift as a function of time, and FIG. 5 which shows the signal supplied to the control valve. These two figures should be considered together.

In general, an appropriate electronic fuel injection control system will select an injection activation pulse depicted in FIG. 5 by a square wave of duration D shown in the drawing. This signal is supplied to the solenoid of the injector control valve assembly 15. Upon the application of the control signal the control valve assembly 15 will rapidly open admitting actuation gas to the metering valve cylinder 24. The metering valve piston 21 and the attached metering valve 19 accelerate from the closed state to maximum lift. Maximum lift is defined by the abutment of the metering valve piston against the metering valve stop surface 44. The duration of this opening process is shown in FIG. 4 by opening ramp 27, extending for a duration indicated by segment A. With the valve fully opened as indicated by line 28, the actuation gas pressure holds the metering valve 19 open for a period of time depicted as segment B in FIG. 4. Removal of the power supplied to the control valve assembly 15 as shown at 29 causes the control valve assembly 15 to vent the pressure present in the metering valve cylinder 24 permitting the restoring force of valve spring 23 to reseat the metering valve 19 on its metering valve seat 20. The closing process is shown by time segment C and by closing ramp 30. In general, the best metering accuracy is achieved when the opening and closing phases of valve motion A and C are short compared to the open duration B. For these reasons it is important to reduce the mass of the metering valve assembly as much as possible.

As shown in FIG. 1 the preferred valve stem 25 is hollow and the metering valve piston 21 is relived to minimize its weight. Additionally it is desirable to form the metering valve seat and other "stop surfaces" from a "soft" material such as iron to minimize stress on the measuring elements of the metering valve assembly 14. The preferred elastic modulus for the metering valve stop surface material should be as low as possible (E<30). In general, materials must be carefully selected to provide a long service life for the metering valve and metering valve seat. Detail design must attempt to reduce stress risers in the valve and valve keeper structures. The preferred light weight keeper structure 26, is a cap screw, which attaches the valve stem to the metering valve piston 21. Suitable O-ring or other seals may be used to seal the mating surfaces of the injector assemblies. Although any of a variety of control valve assemblies can be used. One suitable valve is manufactured by BKM Orshanski under model number BKM3023CF or HSV3000. In a similar fashion the optimum valve head size and lift will depend on each specific engine application.

FIG. 6 shows a typical free-piston engine application of the gas injector 10. The basic components of the engine section 39 include the engine cylinder 32 and engine piston 31. The engine piston 31 is attached to the bounce piston 33 by a rod 34. The bounce piston 33 reciprocates in a bounce cylinder 35. In operation, the engine section 39 powers the compressor section 38. The engine piston 31, cylinder 32 and cylinder head 37 define a combustion chamber 41. Combustible mixture within the combustion chamber 41 may be ignited by a spark plug 42 at an appropriate time determined by the control system 43.

The compressor section 38 and bounce chamber 40 store and regulate the return of energy to the engine section and together they act as the analog of a flywheel in a traditional crank based engine. This bounce chamber 40 and compressor section 38 are connected to a reservoir 36 of compressed air.

The fuel gas inlet 16 is coupled to a regulated source of gaseous fuel such as natural gas (not shown). The injector discharge port 17 is located in an aperture in the cylinder head 37 of the engine. In the particular engine application the compressor section 38 of the engine provides a source of pressurized air to a reservoir 36. Pressurized air from this reservoir 36 actuates the metering valve assembly 14 of the gas injector 10. For further details concerning the operation the engine reference may be had to copending U.S. Pat. application No. 07/761,252 filed Sep. 17, 1991 which is incorporated by reference herein.

In the typical free-piston engine application shown in FIG. 6 compressed air is readily available in the appropriate pressures and volumes to be used as the actuation gas. However where air isn't readily available the actuation gas can be supplied from an alternate source. For example when high pressure CNG gas is used as a fuel, a high pressure supply of fuel can be used to operate the metering valve assembly. In a similar fashion some engine applications may have other pressurized gas available for metering valve 19 actuation.

These and various other modifications can be made to the structure of the injector without departing from the spirit or scope of the invention.

What is claimed is:

1. A fuel injector for introducing a gaseous fuel into an engine in response to an injection signal, said injector comprising:

a metering valve assembly connected to a source of gaseous fuel at a first pressure, for controlling the continuous discharge of said gaseous fuel through a discharge port, said metering valve assembly including a metering valve cylinder, containing a metering valve piston said metering valve piston attached to a metering valve, whereby said metering valve piston position in said metering valve cylinder controls the metering valve area, of said metering valve, said metering valve cylinder having a metering valve piston stop surface to define and limit maximum valve lift;

control valve means coupled to a source of actuation gas for regulating the admission of said actuation gas to said metering valve cylinder, thereby controlling the position of said metering valve piston in said metering valve cylinder, and for venting said actuation gas from said metering valve cylinder.

2. A fuel injector introducing a gaseous fuel into an engine in response to an injection signal, said injector comprising:

a metering valve assembly connected to a source of gaseous fuel at a first pressure, for controlling the continuous discharge of said gaseous fuel through a discharge port, said metering valve assembly including a metering valve cylinder, containing a metering valve piston said metering valve piston attached to a metering valve, whereby said metering valve piston position in said metering valve cylinder controls the metering valve area, of said metering valve, said metering valve cylinder having a metering valve piston stop surface to define and limit maximum valve lift;

an electromagnetically actuated three way fluid control valve having a first position whereby said actuation gas is admitted to said metering valve cylinder, and having a second position whereby actuation gas is vented from said metering valve cylinder, and having a third position whereby actuation gas is not admitted to said metering valve cylinder.

3. The apparatus of claim 1 wherein said metering valve comprises:

a poppet valve mounted for reciprocating motion between a first closed position and a second open position, said poppet valve having a stem connected to said metering valve piston stem for forcing said poppet valve from said first position to said second position in response to the presence of actuation gas acting on said metering valve piston.

4. The apparatus of claim 3 further comprising:
spring means coupled to said metering valve piston for biasing said poppet valve into said first position.

5. A direct injection two stroke free-piston spark ignition engine comprising:

an engine cylinder;

an engine piston located in said engine cylinder;

a bounce cylinder;

a bounce piston located in said bounce cylinder;

a rod connecting said engine piston to said bounce piston;

a reservoir of compressed gas coupled to said bounce cylinder to store and return kinetic energy to said bounce piston;

spark means for igniting mixture in said combustion chamber;

gas fuel injector means for directly injecting a substantially oxygen free gaseous fuel into said combustion chamber;

said fuel injector means including a fuel metering valve having a mechanical stop, said mechanical stop for limiting metering valve motion, and for permitting essentially continuous fuel flow through said metering valve from an essentially constant pressure fuel supply source while said metering valve motion is limited by said mechanical stop.

6. The apparatus of claim 1 wherein said actuation gas is the gaseous fuel.

* * * * *

UNITED STATES PATENT AND TRADEMARK OFFICE
CERTIFICATE OF CORRECTION

PATENT NO. : 5,269,280
DATED : December 14, 1993
INVENTOR(S) : Braun et al.

It is certified that error appears in the above-identified patent and that said Letters Patent is hereby corrected as shown below:

On cover page, column [73], under "Assignee", please delete the word "Bloomington" and insert therefor --Minneapolis--

In column 2, line 12, please delete the word "drawing" and insert therefor --drawings--

In column 3, line 50, please delete the word "relived" and insert therefor --relieved--

Signed and Sealed this

Thirty-first Day of May, 1994

Attest:

BRUCE LEHMAN

Attesting Officer  Commissioner of Patents and Trademarks